United States Patent [19]

Ban et al.

[11] 4,224,650
[45] Sep. 23, 1980

[54] CARTRIDGE EJECTING APPARATUS FOR MAGNETIC TAPE PLAYERS

[75] Inventors: Itsuki Ban, Tokyo; Hidenori Kanno, Funabashi, both of Japan

[73] Assignee: Secoh Giken, Inc., Japan

[21] Appl. No.: 934,908

[22] Filed: Aug. 18, 1978

[30] Foreign Application Priority Data

Oct. 7, 1977 [JP] Japan ................................ 52/120130

[51] Int. Cl.² ...................... G11B 19/02; G11B 15/02
[52] U.S. Cl. .................................................. 360/137
[58] Field of Search ........................... 360/137, 71, 69; 292/144, 201

[56] References Cited

U.S. PATENT DOCUMENTS 3,893,184   7/1975   Ishigami ............................. 360/137

FOREIGN PATENT DOCUMENTS 51-2811   1/1976   Japan .
51-19766  6/1976   Japan .

Primary Examiner—John H. Wolff
Attorney, Agent, or Firm—Steinberg & Blake

[57] ABSTRACT

An automatic cartridge ejecting apparatus for magnetic tape player is provided. The apparatus comprises an eject lever for ejecting the cartridge from the tape player and an electromagnetic latch device adapted to latch the eject lever in a depressed position. The latch device comprises a movable member operatively connected to the eject lever, a magnet and a ferromagnetic lever pivotally connected to the movable member and being engageable with the magnet when the eject lever is in the depressed position. The ferromagnetic lever is configured to provide a mechanical advantage to the magnet for holding the eject lever in the depressed position.

15 Claims, 19 Drawing Figures

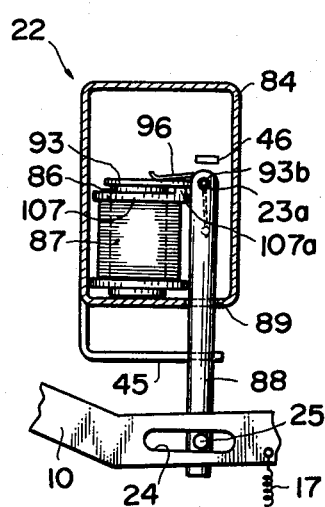
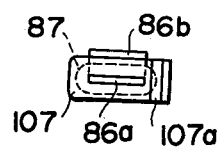
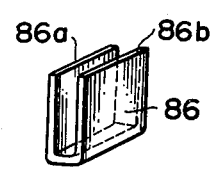
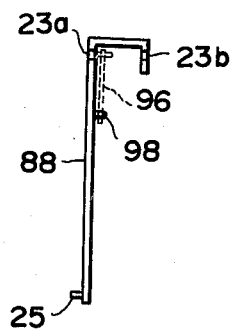
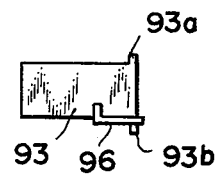
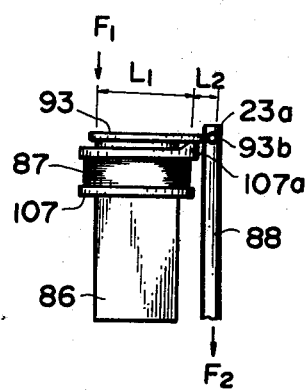
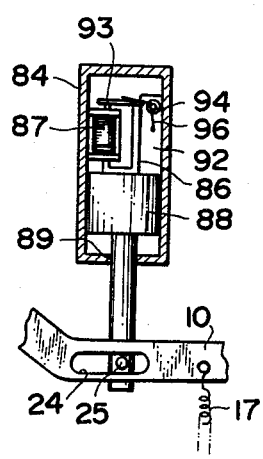

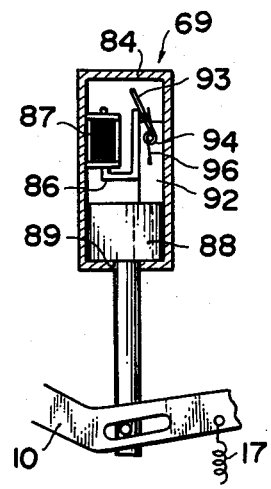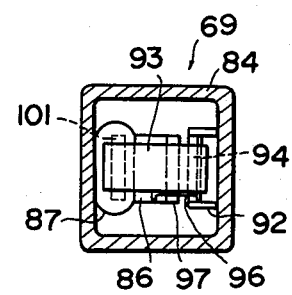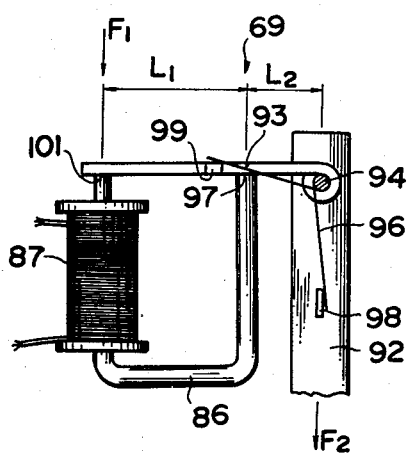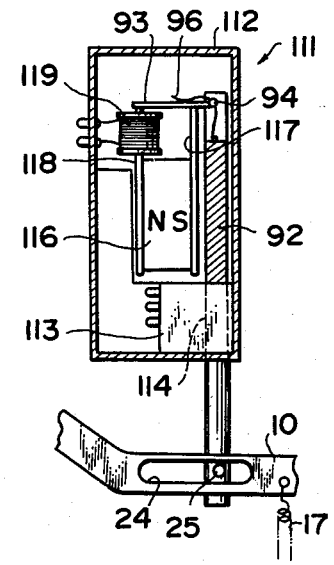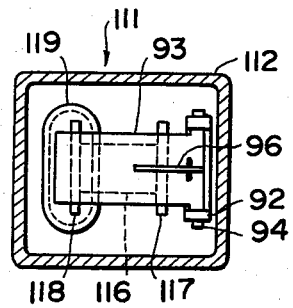

CARTRIDGE EJECTING APPARATUS FOR MAGNETIC TAPE PLAYERS

BACKGROUND OF THE INVENTION

The present invention relates, in general, to an automatic cartridge ejecting apparatus for magnetic tape players and, more particularly, to an automatic cartridge ejecting apparatus for magnetic tape players, having an improved latch device for latching an eject lever for causing an ejecting of the cartridge.

The cartridge ejecting apparatus for the magnetic tape player is either operated manually by a manual operation of an eject lever, or automatically by an electric signal obtained when an end mark recorded on a magnetic tape is detected or by the opening of a main switch.

Conventionally, in order to provide an automatic operation of the ejecting apparatus, it has been usual to latch and hold the eject lever, against the force of a return spring or the like utilizing certain apparatus so that unlatching of the lever will result in movement thereof under the force of the spring whereupon the cartridge, which is engaged by the lever, will be ejected. In the past the eject lever has been latched by means of a plunger associated with a solenoid coil. This arrangement for latching and holding the eject lever, however, has a practical limit of use. Namely, while the size of the plunger and the electric power consumed by the same pose no problem in the case of a large tape deck for a component type high fidelity music system for a home having no limit for the space available for mounting the plunger inside the tape deck housing nor in the size of the power supply, the compact tape players such as those installed on automobiles or other portable players driven by battery power require a reduced size for the latching mechanism and a smaller power consumption since excessive power consumption will quickly drain the batteries.

It is possible to reduce the power consumption even in the case of a conventional latch device which incorporates a plunger, by making the size of the device smaller. However, such a device of reduced size will not be capable of providing a sufficiently large force for overcoming the spring back or return bias of the eject lever which is normally urged by a relatively strong return spring in the direction of ejection, since the conventional latch device exerts a force on the eject lever in linear opposition to the force of the return spring.

Moreover, when it is absolutely required to reduce the power consumption as much as possible, it is extremely difficult to provide an arrangement whereby the cartridge ejecting operation can be performed after the opening of the main switch.

SUMMARY OF THE INVENTION

The cartridge ejecting apparatus according to the present invention comprises an eject lever which is urged in the direction for ejecting the cartridge, and an electromagnetic latch device adapted to latch the eject lever in the depressed position during playing of a tape contained in the cartridge. The latch device comprises a movable member operatively connected to the eject lever, a magnet and a ferromagnetic lever pivotally connected to the movable member and being engageable with the magnet. The ferromagnetic lever is configured to provide a mechanical advantage to the magnet for holding the movable member. The cartridge ejecting apparatus further comprises release means for removing a force of the magnet from the ferromagnetic lever for releasing the movable member.

It is therefore an object of the present invention to provide an automatic cartridge ejecting apparatus for magnetic tape players, having an electromagnetic latch device which is smaller and consumes less electrical power than comparable latch devices producing the same latching force, and an eject lever operatively connected to the latch device.

It is another object of the present invention to provide an automatic cartridge ejecting apparatus for magnetic tape players, having a latch device of a construction such that power consumption is reduced with a corresponding reduction of heat generation in the magnetic tape players.

It is still another object of the invention to provide an automatic cartridge ejecting apparatus for magnetic tape players, having a latch device which is so improved as to minimize the electrical power supply to the controlling circuit for an electromagnetic coil of the latch device.

It is a further object of the present invention to provide an automatic cartridge ejecting apparatus for magnetic tape players, having a latch device improved to ensure the safe operation of the ejecting apparatus even after the opening of a main switch such as the ignition key switch of an automobile.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4a is a sectional view illustrating a latch device of the ejecting apparatus embodying the present invention in a latched position;

FIG. 4b is a plan view of a component of the latch device for the present ejecting apparatus;

FIG. 4c is a perspective view of a component of the latch device for the present ejecting apparatus;

FIG. 4d is a plan view of a component of the latch device for the present ejecting apparatus;

FIG. 4e is an elevational view of a component of the latch device for the present ejecting apparatus;

FIG. 5 is an enlarged elevational view of the main components of the latch device of the present ejecting apparatus;

FIGS. 6 and 7 are sectional views illustrating a modified latch device of the ejecting apparatus embodying the present invention in a latched and unlatched position respectively;

FIG. 8 is a plan view of the latch device of FIG. 6;

FIG. 9 is an enlarged elevational view of the main components of the latch device of the present ejecting apparatus;

FIG. 10 is an elevational view of yet another latch device of the ejecting apparatus embodying the present invention;

FIG. 11 is a plan view of the latch device of FIG. 10;

DESCRIPTION OF THE PREFERRED EMBODIMENTS

While the tape cartridge ejecting mechanism including an improved latch device for a magnetic tape player of the present invention is susceptible of numerous physical embodiments, depending upon the environment and requirements of use, substantial numbers of the herein shown and described embodiments have been made, tested and used, and all have performed in an eminently satisfactory manner.

Figure 1:
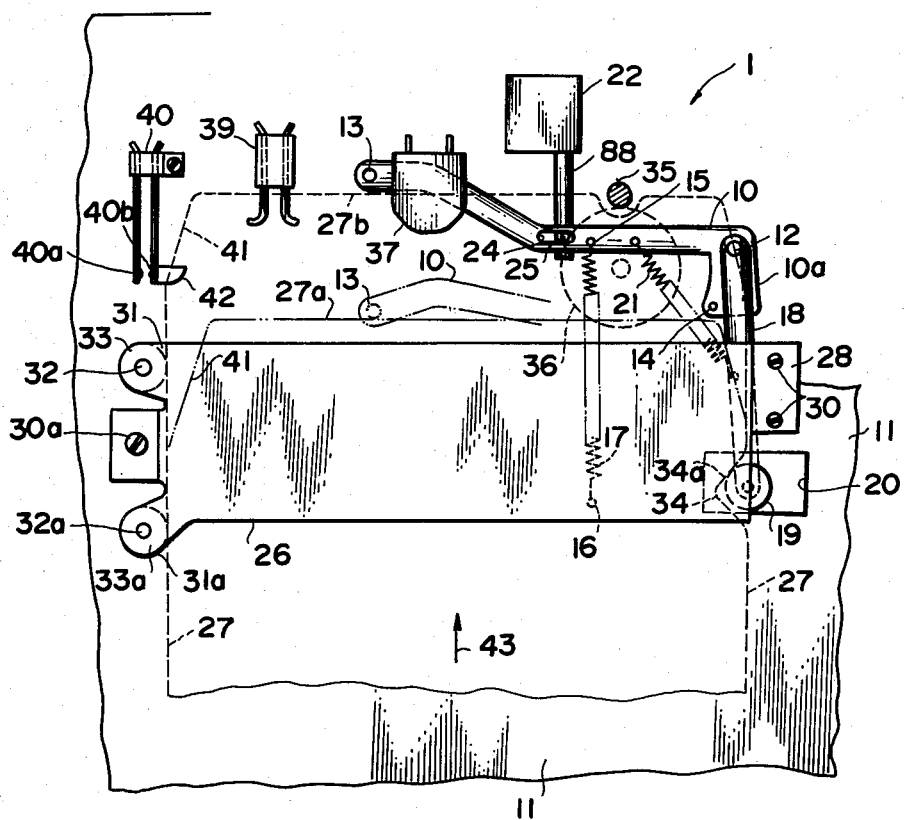
FIG. 1 is a plan view of a cartridge ejecting apparatus for a tape player embodying the present invention.

Referring now to FIG. 1 of the drawing, a magnetic tape player embodying the present invention is generally designated by the reference numeral 1. In the drawing, an eject lever 10 is pivotally supported on the reverse side (in the drawing) of a frame 11 of the tape player 1 by means of a pin 12. Further, fixed to the left end of the eject lever 10 is projected pin 13, the function of which will be described in detail below. The eject lever 10 is formed with an extension 10a which extends integrally therefrom. A pin 14 is fixed to the lower end portion of the extension 10a, the function of which will be described in detail below. A tension spring 17 is connected between a portion 15 of the eject lever 10 and a portion 16 of the reverse side of the frame 11 and the tension spring 17 biases the eject lever 10 in the counterclockwise direction about the pin 12.

A roller arm 18 is also pivotally supported on the reverse side of the frame 11 by means of the pin 12. The arm 18 rotatably supports a press roller 19 at the end thereof. The press roller 19 projects above the upper surface of the frame 11, through an opening 20 formed on the frame 11. A tension spring 21 is connected between the eject lever 10 and the roller arm 18 so as to urge them toward each other.

A latch device 22 is provided to latch a plunger 88 and thereby the eject lever 10 in a depressed position as shown in FIG. 1 by full lines. The plunger 88 is operatively connected at one end thereof to the latch device 22. The eject lever 10 has an elongated opening 24 formed therethrough substantially at a central portion thereof, and a small projection 25 formed on the lower end of the plunger 88 extends into this opening 24 with a certain free clearance. It is this clearance which provides for smooth rotation of the eject lever 10 between a first position in which the eject lever 10 is latched and a second position in which the eject lever 10 is unlatched, these first and second positions of the eject lever 10 by shown in FIG. 1 by full lines and broken lines, respectively. The latch device 22, the eject lever 10 and the roller arm 18 are provided, as stated above, on the reverse side (in the drawing) of the frame 11.

Further illustrated is a guide plate 26 which is adapted to guide a cartridge 27 of conventional construction shown by broken lines when the cartridge is inserted into the tape player 1. The guide plate 26 is fixed at its rightward and leftward extensions 28, 29 by means of screws 30, 30a. Further, guide rollers 33, 33a are mounted on the leftward extensions 31, 31a, by means of pins 32, 32a, so as to contact the cartridge 27 to be inserted.

A notch 34 is formed at the right-hand side portion (as viewed in FIG. 1) of the cartridge 27. The arrangement is such that the inclined surface 34a of the notch 34 is pressed by the press roller 19 provided at the end portion of the arm 18, when the cartridge 27 is in the inserted position.

The cartridge 27 may be inserted into the tape player 1 in the direction of an arrow 43 as viewed in FIG. 1 and removed from the player 1 in the opposite direction.

The tape player 1 further comprises a capstan 35 which extends upwardly from a flywheel (not shown) which is rotatably supported by the frame 11 and is driven from a motor (not shown). The cartridge 27 is provided with a pressure roller 36 which is rotatably supported therein. The pressure roller 36 engages the tape (not shown) in the cartridge 27 to press the same against the capstan 35. The pressure roller 36 is maintained in pressing engagement with the tape by means of the press roller 19 which presses the cartridge 27 at the inclined surface 34a of the notch portion 34 by means of the tension spring 21.

A magnetic pickup head 37 is provided by known means to face the magnetic tape (not shown) in the cartridge 27. The capstan 35 in combination with the pressure roller 36 function to move the tape past the pickup head 37 which feeds electrical signals corresponding to the magnetic patterns on the tape to a sound reproduction circuit (not shown).

Further illustrated is a detecting contact 39 for detecting an end mark. This contact is a known one capable of detecting the end mark in the magnetic tape and converting it into an electric signal. No further description of this contact 39 is made here, because this contact is conventional.

A reference numeral 40 denotes a conventional door switch having an engaging member 42 adapted to be depressed by the inclined surface 41 on the front part of the cartridge 27 when the latter is manually inserted into the inserted position. As the engaging member 42 is depressed, contacts 40a, 40b are closed, so that the electric power is applied to the tape player 1.

Hereinafter, a description will be made as to the operation of the cartridge ejecting mechanism for the magnetic tape player in accordance with the invention.

Referring first to FIG. 1, as the rear end of the cartridge 27 in the ejected position is pressed manually in the direction of the arrow 43, the pin 13 of the eject lever 10, which has been returned by the action of the tension spring 17 to the position as shown by broken lines in FIG. 1, is depressed by the front end 27a of the cartridge 27. Consequently, the eject lever 10 is rotated clockwise, overcoming the force of the spring 17. At the same time, the press roller 19 comes into contact with the notch portion 34. As the lever 10 is further rotated clockwise, the pin 14, which has urged the arm 18 counter-clockwise, is moved away from the arm 18. As a result, due to the action of the spring 21, the press roller 19 strongly presses against the inclined surface 34a of the cartridge 27, so that the pressure roller 36 is pressed strongly against the capstan 35, through the magnetic tape interposed therebetween. In this state, the pickup head 37 operatively engages the magnetic tape (not shown) in the cartridge 27.

Meanwhile, the inclined surface 41 of the inserted cartridge 27 depresses the engaging member 42 of the door switch 40, so as to close the contacts 40a, 40b of the door switch 40. This causes the latch device 22 to be energized, and the latch device 22 latches the plunger 88 and thereby latch the eject lever 10 in the position shown by full lines in FIG. 1. Also, this causes a sound reproduction circuit (not shown) to be energized and also energize the drive motor to drive the capstan 35 at a normal speed for playing the tape.

In the meanwhile, as the latch device 22 is deenergized, the plunger 88 is unlatched to thereby release the eject lever 10. Consequently, the eject lever 10 is rotated counter-clockwise by the force of the tension spring 17, so that the pin 13 comes into contact with the front end 27b of the cartridge 27. In this state, the pin 14 provided on the extension 10a of the eject lever 10 contacts the roller arm 18, so that the roller arm 18 and the eject lever 10 further rotate integrally counter-clockwise. Consequently, the press roller 19 is completely clear of the inclined surface 34a of the notch portion 34. More particularly, since the press roller 19 is retracted to the right from the notch portion 34 as viewed on FIG. 1, so that the cartridge 27, which is pressed at its front end 27b by the pin 13, is ejected with a relatively small force in the direction opposite to that shown by the arrow 43, to the initial ejected position which is shown by the front end 27a.

Meanwhile, the contacts 40a, 40b of the door switch 40 are opened as the cartridge 27 is ejected. This in turn causes the entire tape player 1 to be deenergized and to stop the play of the tape.

Figure 2:
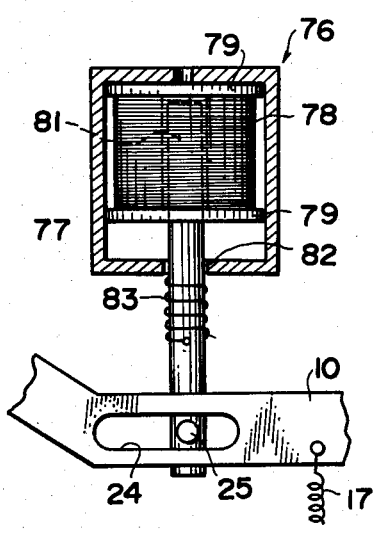
FIGS. 2 and 3 are sectional views illustrating a prior art latch device for the ejecting apparatus in a latched and unlatched position respectively.
Figure 3:
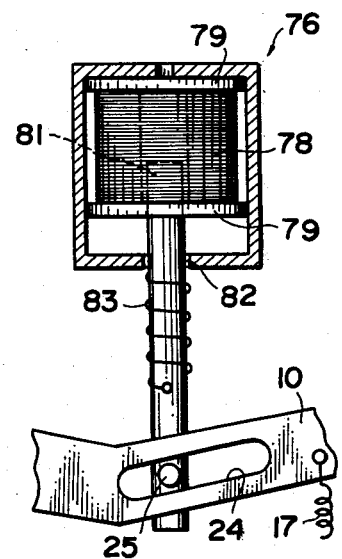

A prior art latch device 76 which has heretofore been used is illustrated in FIGS. 2 and 3. The device 76 is essentially an electrical solenoid comprising a casing 77. An electromagnetic coil 78 wound around a hollow bobbin 79 is fixedly mounted inside the casing 77. A ferromagnetic plunger 81 is axially slidably supported inside the bobbin 79 and extends downwardly from the casing 77 through an opening 82. The lower end of the plunger 81 is provided with the pin 25. The pin 25 operatively engages with the elongated opening 24 of the eject lever 10 with certain free clearance as described above. A compression spring 83 may be provided to assist the spring 17 urging the plunger 81 downwardly as viewed in the drawing.

The latch device 76 suffers from the drawback discussed hereinabove in that it must apply a large force to the plunger 81 to latch the lever 10 against the force of the springs 83, 17 and also 21. The spring 17 is a return spring for the lever 10 and generally is relatively strong. It will further be realized that the latch device 76 must apply the latching force in linear opposition to the force of the return spring 17. Thus, the latch device 76 must be disproportionately large in size and power consumption to positively latch the lever 10 and other components as required.

These problems are completely overcome by the present latch device 22 which is illustrated in detail in FIGS. 4a to 5. The latch device 22 comprises a plastic casing 84 in which is fixedly supported a ferromagnetic U-shaped core 86. The core 86 comprises two, vertically elongated, flat ferromagnetic arms 86a and 86b which extend parallel to each other (FIG. 4c). An electromagnetic coil 87 is wound around a bobbin 107 fixed to one of the flat arms 86a, 86b of the U-shaped core 86 (FIG. 4b). The coil 87 is designed to induce magnetic force in the core 86. Upwardly extending projection 107a is formed on the right upper surface of the bobbin 107. The projection 107a is designed to extend upwardly from the bobbin 107 by the same height as the top end of the core 86.

A plunger 88 is slidably supported in the casing 84 and extends downwardly through a hole 89 and a plunger guide member 45 into connection with the lever 10 by means of the pin 25 and the elongated opening 24 of the lever 10. A ferromagnetic latching lever 93 is pivotally connected at the right end thereof to the top end of the plunger 88, and is thereby pivotal in a plane parallel to the plane of the drawing. A tension spring 96 urges the lever 93 counterclockwise into constant engagement with the projection 107a which serves as a fulcrum for the lever 93. The spring 96 is wound around a projection 93b (FIG. 4d) and engages with the lever 93 and a tab 98 (FIG. 4e) provided on the inner side of the plunger 88.

As will be seen from FIG. 4e, the plunger 88 is provided at its upper end with two openings 23a, 23b which are adapted to loosely receive the projections 93a, 93b, respectively, of the ferromagnetic latching lever 93. Thus, the lever 93 is rotatably supported by the plunger 88. In FIG. 4a, a reference numeral 46 denotes a stopper for limiting the stroke of the plunger 88, and is provided on the casing 84 as necessitated.

FIGS. 4a and 5 illustrate the latched position of the latch device 22, in which the lever 10 is latched in the depressed position.

In this case, the lever 10 and the plunger 88 are moved upwardly through manual depression of the cartridge 27 until the lever 93 engages an upper end of the core 86. At this time, the coil 87 is energized to magnetically hold the lever 93 to the core 86. Thereafter, even if the cartridge 27 is released from the depression, the cartridge 27, the lever 10, the plunger 88 and associated components will be held in the depressed positions by the latch device 22 and the press roller 19 (FIG. 1).

More specifically, the springs 17 and 21 urge the plunger 88 and lever 10 downwardly with a combined force F2. This force F2 urges the lever 93 to pivot clockwise about the fulcrum projection 107a of the bobbin 107 with a moment $F2 \times L2$, where L2 is the distance between the projection 107a and the projection 93b. However, the coil 87 induces magnetic flux in the core 86 which attracts the lever 93 to the upper end of the core 86 with a force F1. This urges the lever 93 counterclockwise about the fulcrum projection 107a with a moment $F1 \times L1$, where L1 is the distance from the side end portion of the core 86 to the projection 107a. F1 is selected to be sufficiently high that $F1 \times L1 > F2 \times L2$. Thus, the lever 93 is held in the position of FIGS. 4a and 5 by the force F1 of the coil 87. It will be noted that the coil 87 in combination with the core 86 constitute an electromagnet, and that a magnetic circuit through the core 86 and lever 93 is completed with the lever 93 in engagement with ends of the flat arms 86a and 86b of the core 86.

When the coil 87 is de-energized, the magnetic force exerted on the lever 93 is removed and the lever 10, plunger 88 and associated components are moved to the released position by the springs 17 and 21. It will be noted that downward movement of the opening 23a causes the lever 93 to pivot clockwise about the projection 107a out of engagement with the top end of the core 86. However, the lever 93 is maintained in engagement with the projection 107a by the spring 96 and will re-engage the top end of the core 86 when the plunger 88 is moved upwardly through depression of the cartridge 27. If desired, the spring 96 may be omitted and the lever 93 maintained in engagement with the projection 107a by gravity.

It will be understood by all those skilled in the art that the lever 93 is a first class lever and, where L1>L2, provides a mechanical advantage to the magnet comprising the coil 87 and core 86 for holding the lever 93 in the latched position. The magnitude of the mechanical advantage is equal to L1/L2, in the illustrated example where the lever 93 is perpendicular to the plunger 88 in the latched condition. This enables the coil 87 to be made so small as to apply a force to the lever 93 which is equal to the magnitude of the force applied by the prior art latch device 76 divided by the mechanical advantage of the lever 93. In a practical application where L1/L2=3, the coil 87 may be made so small as to apply only ⅓ the magnetic force required by the coil 78 of the prior art latch device 76. This allows a substantial reduction in the size of the latch device as well as in the power consumption thereof. Thus, the present latch device 22 allows the tape player 1 to be installed in a motor vehicle such as an automobile or embodied as a portable unit powered by batteries without the excessive size and power requirements of the prior art.

In a practical latch device 22 manufactured in accordance with the present invention, the mechanical advantage (L1/L2) was equal to 3, and the dimensions of the latch device were only 15 mm (width), 10 mm (depth) and 20 mm (height). The latch device 22 thus constructed was capable of reliably latching the lever 10 against a force F2 of 2 kg, while only dissipating 12 V, 50 mA of electrical power.

FIGS. 6 to 9 illustrate another latch device 69 for embodying the present invention which, although configured somewhat differently from the latch device 22, operates on the same principles. Like elements are designated by the same reference numerals.

In this embodiment, an electromagnetic coil 87 is wound around a left arm of the core 86. A plunger 88 is slidably supported in the casing 84 and extends downwardly through a hole 89 into connection with the lever 10. An extension 92 of the plunger 88 extends upwardly adjacent to the right arm of the core 86. A ferromagnetic latching lever 93 is pivotally connected at the right end thereof to the extension 92 by means of a pin 94, and is thereby pivotal in a plane parallel to the plane of the drawing. A torsion spring 96 urges the lever 93 counterclockwise into constant engagement with a right upper end 97 (FIG. 9) of the core 86 which serves as a fulcrum for the lever 93. The spring 96 is wound around the pin 94 and engages with tabs 98 and 99 provided on the extension 92 and lever 93 respectively.

FIGS. 6 and 9 illustrate the latched position of the latch device 69. It will be noted that the coil 87 in combination with the core 86 constitute an electromagnet, and that a magnetic circuit through the core 86 and lever 93 is completed with the lever 93 in engagement with both ends 97 and 101 of the core 86.

When the coil 87 is de-energized, the magnetic force exerted on the lever 93 is removed and the lever 10, plunger 88 and associated components are moved to the released position. This condition is illustrated in FIG. 7. It will be noted that downward movement of the pin 94 causes the lever 93 to pivot clockwise about the end 97 out of engagement with the end 101. However, the lever 93 is maintained in engagement with the end 97 by the spring 96 and will re-engage the end 101 when the plunger 88 and thereby the extension 92 thereof are moved upwardly through depression of the cartridge 27. As will be understood from the above, the basic operation of the latch device 69 is the same as the latch device 22.

FIGS. 10 and 11 illustrate another latch device 111 embodying the present invention which comprises a casing 112. In this case, the plunger is designated as 114 and is adapted to actuate a changeover switch 113.

The latch device 111 comprises a permanent magnet 116 made of ferrite or the like which is fixedly mounted in the casing 112. Upstanding ferromagnetic bars 117 and 118 are fixed to the north and south poles of the magnet 116 as illustrated, with corresponding magnetic forces being induced in the bars 117 and 118 by the magnet 116. An electromagnetic coil 119 is wound around the upper portion of the bar 118.

The coil 119 is normally de-energized so that the lever 93 is normally held in the latched position as illustrated in FIG. 10 by the magnet 116. More specifically, the magnetic force of the magnet 116 forms a magnetic circuit through the bars 117 and 118 and lever 93 which holds the lever 93 in the latched position.

The coil 119 is designed, when energized, to induce a magnetic force in the bar 118 of a polarity opposite to the force of the magnet 116 and of approximately equal magnitude. The force of the coil 119 thereby effectively neutralizes the force of the magnet 116, allowing the lever 93 to be released. In this case, the upper end of the bar 117 serves as the fulcrum for the lever 93, and the magnetic force for holding the lever 93 in the latched position is applied thereto from the bar 118. Thus, neutralization of the magnetic force in the bar 118 allows the lever 10 and the plunger 114 to move to an unlatched position which, although not illustrated, is similar to FIG. 7.

It is effective to provide an electric switch 113 which is adapted to be operated in relation to the operation of the plunger 114, in accordance with the latch modes of the apparatus.

The latch device 111 is advantageous in that it consumes no electrical power in either the latched or unlatched conditions, and can be unlatched by a single electrical pulse applied to the coil 119.

Figure 12:
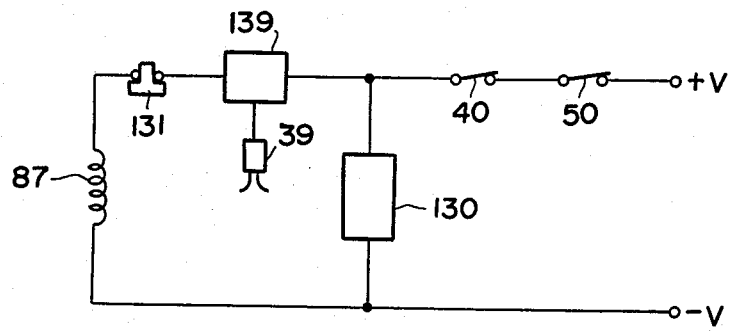
FIG. 12 is an electrical schematic diagram of the control system.

Hereinafter, an example of the energization controlling circuit for the latch device as shown in FIGS. 4 to 9 will be described, with reference to, by way of an example, a tape player installed on an automobile as shown in FIG. 12.

Reference numerals 50 and 40 denote, respectively, an ignition key switch of an automobile and the door switch as shown in FIG 1. A known detecting circuit 139 is adapted to open the power supply circuit, upon detecting of an electric signal from the detecting contact 39 for detecting the end mark recorded in the tape. A reference numeral 130 denotes an electric motor and the amplifier circuit of the tape player for the automobile. A push button for causing the cartridge ejecting operation is designated at a numeral 131. An electromagnetic coil of the latch device as shown in FIG. 1 is denoted by a numeral 87. In use, as the cartridge 27 is inserted, the door switch 40 is closed to allow the energization of the electromagnetic coil 87, so that the latch device latches the eject lever 10, and the tape player 1 starts to play the tape in the manner as explained before.

As the push button switch 131 is depressed, the power circuit is opened to release the plunger 88 and thereby the eject lever 10, so that the cartridge is ejected to the ejected position denoted by 27a in FIG. 1. The electromagnetic coil 87 is de-energized also by the opening of the key switch 50, so that the cartridge 27 is automatically ejected and the playing of the tape is stopped. The automatic ejection of the cartridge and stopping of the playing are effected in the same manner, when the detecting circuit 139 is actuated to open the power curcuit, upon detecting of the end mark in the tape by the detecting contact 39.

Figures 13A, 13B:
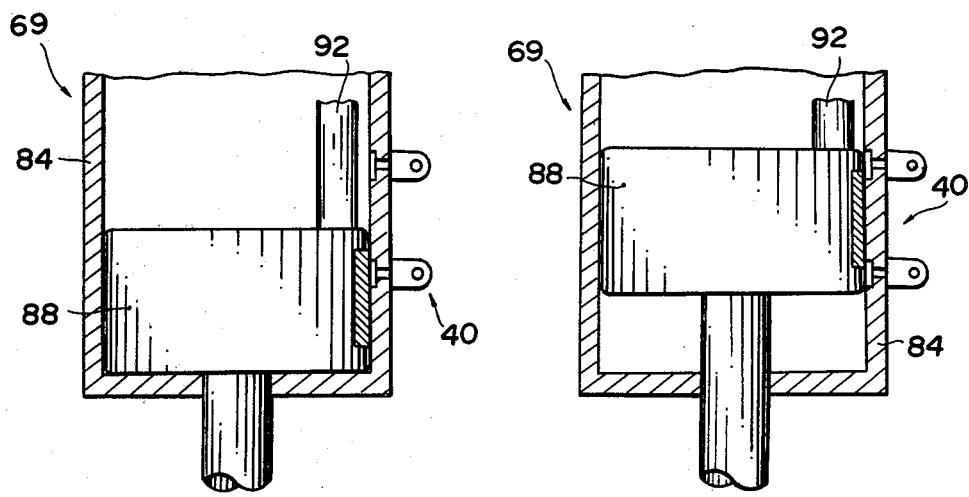
FIGS. 13a and 13b are sectional views of a control switch in released and depressed position respectively.

Further, a switch 40 operatively associated with the plunger 88 may be used in place of the door switch 40 of FIG. 1, as shown in FIGS. 13a and 13b. In such a case, the switch 40 is conveniently operated in accordance with the latch and unlatch modes of the apparatus.

Figure 14:
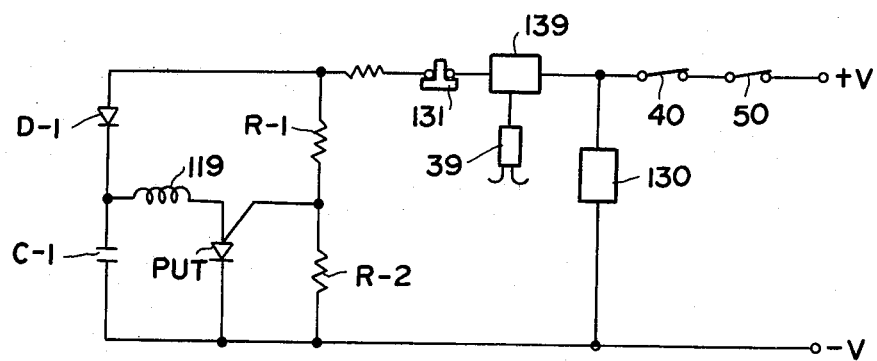
FIG. 14 is an electrical schematic diagram of a modified control system.

FIG. 14 shows a controlling circuit for controlling the operation of the electromagnetic coil for the latch device 111 as shown in FIGS. 10 and 11.

In this circuit, during the playing of the tape, a set voltage is applied across the gate of the programmable unijunction transistor PUT, through the resistors R-1 and R-2. At the same time, the capacitor C-1 is charged through the diode D-1. Consequently, the anode voltage is maintained higher than the gate voltage. In this state, the electromagnetic coil 119 of the latch device 111 is never energized, because the transistor PUT does not conduct.

Then, as the power circuit is opened by either one of the key switch 50, push button switch 131 or by the end mark detecting circuit 139, the gate voltage is dropped to 0 (zero). However, since the voltage is applied to the anode through an electric discharge from the capacitor C-1, the transistor PUT is turned to conduct. Consequently, the electromagnetic coil 119 is energized until the discharge from the capacitor C-1 is completed. Namely, during the playing of the tape in which the electromagnetic coil 119 is not energized, the latch device 111 is kept in the latching condition as shown in FIG. 10, due to the presence of the magnetic force provided by the magnet 116. However, when the playing of the tape is to be stopped, the electromagnetic coil 119 is energized, so as to neutralize a magnetic force of the magnet 116, thereby to release the latching operation of the latch device.

In the eject mechanism for tape player incorporating the electromagnetic latch device of the present invention having the described construction, the cartridge is automatically ejected without fail, even when the driver has withdrawn the ignition key and left the automobile with the cartridge left inserted in the player.

Similarly, when the apparatus of the invention is used in a stereophonic tape player for domestic use, the cartridge is automatically ejected when the main switch is opened and when the power supply cord is pulled to extract the plug from the receptacle.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An apparatus for automatically removing a tape cartridge from a first position in which a magnetic tape in said cartridge is engaged with a sound reproduction means of a magnetic tape player to a second position in which said tape in said cartridge is clear of said sound reproduction means of said magnetic tape player comprising:
    a frame;
    ejecting means mounted on said frame, said ejecting means being movable between a third position in which said cartridge is in said first position and a fourth position in which said cartridge is in said second position;
    a movable member for controlling said ejecting means and operatively connected to said ejecting means, said movable member holding said ejecting means at said third position when in a depressed position and at said fourth position when in a released position;
    a magnet;
    a ferromagnetic lever pivotally connected to said movable member and being engageable with said magnet when said movable member is in said depressed position, the ferromagnetic lever being configured to provide a mechanical advantage to said magnet for holding said movable member in said depressed position; and
    release means for removing a force of the magnet from said ferromagnetic lever for releasing said movable member.

2. An apparatus as claimed in claim 1, wherein said ejecting means includes an eject lever and first biasing means urging said eject lever toward said fourth position.

3. An apparatus as claimed in claim 2, wherein said eject lever is pivotally supported at one end thereof on said frame, the eject lever being engageable at an opposite end thereof with one edge of said cartridge, the eject lever having substantially at a central portion thereof an opening into which a projection formed on one end of said movable member extends with a certain free clearance.

4. An apparatus as claimed in claim 2, further comprising pressing means for pressing said cartridge against said first position.

5. An apparatus as claimed in claim 4, wherein said pressing means comprises a roller arm pivotally supported at one end thereof on said frame and second biasing means urging said roller arm toward said cartridge, the roller arm having at an opposite end thereof a press roller which presses a side edge of said cartridge when the latter is in said first position.

6. An apparatus as claimed in claim 5, further comprising means for effecting a co-relative movement of said roller arm with said eject lever, said means including a tension spring interconnecting said roller arm and said eject lever and an engaging member which is provided on said eject lever and is engageable with said roller arm for removing said press roller away from said side edge of said cartridge when the eject lever is moved toward said fourth position.

7. An apparatus as claimed in claim 1, wherein the ferromagnetic lever is pivotally connected at one end thereof to said movable member, the ferromagnetic lever being engageable at an opposite end thereof with the magnet, the apparatus further comprising a fulcrum member disposed between the magnet and the movable member, a distance between the magnet and the fulcrum member being greater than a distance between the movable member and the fulcrum member.

8. An apparatus as claimed in claim 7, wherein said magnet comprises a generally U-shaped ferromagnetic core and an electromagnetic coil wound around a first arm of the core through a bobbin, the fulcrum member being constituted by a projection extended from said bobbin, said ferromagnetic lever being engageable with two opposite ends of the core for completing a magnetic circuit through the core and the lever.

9. An apparatus as claimed in claim 8, further comprising third biasing means for urging the ferromagnetic lever into engagement with the fulcrum member.

10. An apparatus as claimed in claim 9, wherein said third biasing means comprises a spring.

11. An apparatus as claimed in claim 9, wherein said third biasing means comprises the ferromagnetic lever which is urged by gravity into engagement with the fulcrum member.

12. An apparatus as claimed in claim 7, wherein said magnet comprises a generally U-shaped ferromagnetic core and an electromagnetic coil wound around a first arm of the core, the fulcrum member being constituted by a second arm of the core, the ferromagnetic lever being engageable with ends of the first and second arms of the core.

13. An apparatus as claimed in claim 1, wherein said magnet is an electromagnet.

14. An apparatus as claimed in claim 1, wherein said magnet is a permanent magnet, said release means comprising an electromagnetic which, when energized, neutralizes a magnetic force of the magnet.

15. An apparatus as claimed in claim 1, further comprising a switch actuated by said movable member.

* * * * *